United States Patent [19]
Estrick et al.

[11] Patent Number: 5,237,332
[45] Date of Patent: Aug. 17, 1993

[54] RECEIVER DISTORTION CORRECTION CIRCUIT AND METHOD

[75] Inventors: Vaughn H. Estrick; Ronald T. Siddoway, both of Fullerton, Calif.

[73] Assignee: Hughes Aircraft Company, Los Angeles, Calif.

[21] Appl. No.: 841,142

[22] Filed: Feb. 25, 1992

[51] Int. Cl.$^5$ .......................... G01S 7/40; H04B 1/10; H04B 1/12

[52] U.S. Cl. .................. 342/174; 455/205; 455/305; 330/259; 330/290; 342/91

[58] Field of Search ............ 342/91, 92, 93, 159, 342/173, 174; 455/205, 305, 296, 303, 304, 306, 307, 308, 309, 312; 330/259, 282, 290

[56] References Cited

U.S. PATENT DOCUMENTS

| | | | |
|---|---|---|---|
| 3,845,484 | 10/1974 | Sawicki et al. | 342/401 |
| 4,340,854 | 7/1982 | Jones et al. | 324/623 |
| 4,525,685 | 6/1985 | Hesselberth et al. | 331/10 |
| 4,584,710 | 4/1986 | Hansen | 455/226 |
| 4,967,164 | 10/1990 | Sari | 330/149 |
| 4,968,968 | 11/1990 | Taylor | 342/174 |
| 4,989,219 | 1/1991 | Gerdes et al. | 375/17 |
| 5,079,515 | 1/1992 | Tanimoto | 330/256 |
| 5,172,123 | 12/1992 | Johnson | 342/200 |

Primary Examiner—John B. Sotomayor
Attorney, Agent, or Firm—Wanda K. Denson-Low

[57] ABSTRACT

A distortion correction circuit having a mechanism for intercepting a distorted output signal from a receiver and for generating an Nth order signal. A circuit is provided to subtract the Nth order signal from the distorted output signal for providing a circuit output signal. Finally, a feedback loop is provided to feed back the circuit output signal for controlling the Nth order signal and for providing a distortion corrected circuit output signal. In a preferred embodiment, the distortion correction circuit includes a calibration circuit which provides a calibration signal employed to linearize a receiver channel. The receiver channel includes a plurality of receiver stages which receive the calibration signal and provide the distorted output signal which is intercepted and directed to a cubing circuit. The cubing circuit generates an error correction signal controlled by the feedback loop to cancel the distortion component of the distorted output signal. In the preferred embodiment, the feedback loop controls the amplitude and phase of the error correction signal while in another illustrative embodiment, only the amplitude of the error correction signal is controlled.

Thus, the invention discloses a correction circuit arrangement for a receiver channel which provides a distortion corrected output signal by effectively removing the distortion generated by the receiver.

21 Claims, 4 Drawing Sheets

RECEIVER DISTORTION CORRECTION CIRCUIT AND METHOD

BACKGROUND OF THE INVENTION

1. Field of the Invention

The present invention relates to RADAR and communication systems. More specifically, the present invention relates to methods and apparatus for distortion correction within RADAR and communication receivers.

While the present invention is described herein with reference to illustrative embodiments for particular applications, it should be understood that the invention is not limited thereto. Those having ordinary skill in the art and access to the teachings provided herein will recognize additional modifications, applications and embodiments within the scope thereof and additional fields in which the present invention would be of significant utility.

2. Description of the Related Art

High dynamic range receiver amplifiers are in demand in modern RADAR and communication systems. However, the non-linearity within a receiver channel causes the channel output signal to be compressed for large input signals. The primary sources of the non-linearity within, for example, a RADAR receiver channel are the amplifiers (gain stages), frequency conversion mixers and, to a lesser extent, components such as switches and variable attenuators. All of these components contribute to the non-linearity of the overall receiver channel. A convenient method of denoting the linearity of these analog devices is the output two-tone third-order intercept point (IP3). The output third-order intercept point is the theoretical output power level (point) at which the intermodulation distortion components are at an equal amplitude to the fundamental carrier tones. From this definition, it can be seen that a higher third-order intercept point results in an analog device with lower distortion levels for a given output power level.

The goal is to achieve a linear output signal from the receiver channel. However, depending upon the amplification provided by the receiver channel, certain problems occur. For example, if two signals of different frequencies (e.g., $f_1$ and $f_2$) are received in the channel, cross-modulation occurs resulting in a pair of undesirable side distortion components in the output signal. The least desirable side distortion components, which are generally cubic in nature, are identified by the terms $(2f_1 - f_2)$ and $(2f_2 - f_1)$. Another example is directed to the non-linearity existing in RADAR receiver applications caused by large ground clutter returns. The non-linear induced distortion exhibits a stronger return signal at a specific frequency than a signal produced by, for example, a small target such as an aircraft or a missile. Thus, the non-linearity causes the clutter return spectrum to spread resulting in the masking of the smaller target signal.

An example of non-linear distortion directed to communication systems includes a communication receiver which receives two or more signals simultaneously. Such an example would include a cable television system. In cable television applications, the signals of multiple channels are simultaneously amplified by a single amplifier. The non-linearity of the single amplifier results in intermodulation distortion that generates signals resulting from cross-modulation of two or more channel signals.

The problems associated with mitigation of the non-linear induced distortion and achievement of a linear output signal from the receiver channel have been addressed in the past. Feedback amplifiers employing resistive feedback loops have been utilized for error correction. In this manner, the output signal can be compared to the input signal. Any error resulting from the comparison is reduced at a summing junction. Voltage division sets the gain and enables the output signal and the input signal to be directly compared to cancel the error. The number of feedback amplifiers becomes excessive and, thus, the scheme is expensive.

The requirement for receiver gain stages that exhibit a high third-order intercept point (IP3) and a high level of inherent linearity has been satisfied by employing very high power class A amplifiers. These class A amplifiers are capable of several watts of output power. To make the gain stages more linear, the linear region must be expanded. Although the Class A amplifier serves this purpose, several disadvantages result including excessive cost, high prime power consumption and large size. Because of the high output saturation power capability of the Class A amplifier, a risk of damaging components immediately following the amplifier exists. Delicate devices such as mixers and SAW filters which require high third-order intercept point amplifiers for input drivers are especially vulnerable to damage from overdriving.

The requirement for high third-order intercept point frequency conversion mixers may also be satisfied through conventional technology. Extremely high level mixers may be used in the receiver or, if greater linearity is required, the mixers may be connected in parallel. The high third-order intercept point is effectively doubled every time the number of parallel mixers is doubled. The use of extremely high level mixers requires local oscillator drive levels approaching one watt. Amplifiers that produce a power level approaching one watt are expensive, use large amounts of prime power and create excessive heat that must be dissipated. Further, using high level mixers in parallel compounds these problems.

Feedforward techniques have been used previously to perform error cancellation. In particular, the techniques have been utilized on individual stages. Because of the need for accurate phase and amplitude match, the techniques are difficult to implement at high frequencies. One such method of extending the effective intercept point of an analog circuit without increasing the output saturation power or the D.C. prime power requirement is known as feedforward intermodulation distortion cancellation. This technique is a variation of feedforward error cancellation used for lower frequency (audio) power amplifiers. Further, this technique deals mainly with an increasing of the linearity of a single amplifier stage or a cascade of amplifiers.

In the feedforward technique, an RF input signal is coupled to a high power amplifier which, unfortunately, generates distortion. The original RF input signal is compared with and subtracted from a sample of the distorted power amplifier output signal to yield the distortion signal generated by the power amplifier. The distortion signal is then passed through a low noise amplifier which provides an error distortion signal. The error distortion signal is transmitted to an output terminal where it is subtracted from the distorted power amplifier output signal to yield a low distortion amplified version of the original RF input signal. This feedforward technique causes the signals to be boosted in amplitude and extends the linear region of the amplifier without extending the saturation point. Thus, overdriving delicate components downstream of the amplifier is not a problem.

Unfortunately, other problems arise in connection with the use of this feedforward technique. For example, the technique is primarily applicable when the input and output frequencies are equal. In order to permit this scheme to function properly, the feedforward circuit architecture described above must be incorporated into each of a plurality of cascaded amplifier stages. Feedforward amplifier stages are used at each of the progressively lower intermediate frequencies (IF). Mixers are employed to assist in the frequency conversion. All frequency conversions are completed prior to the input of the signal into a digital processor. Because the feedforward circuit architecture must be incorporated into each cascaded stage, the circuitry of this technique is space consuming and expensive.

Thus, there is a need in the art for an improvement by which the linear range of a signal receiver may be expanded without increasing the output saturation power, in a cost effective and space efficient manner.

SUMMARY OF THE INVENTION

The need in the art is addressed by the receiver distortion correction circuit and method of the present invention. The invention includes a mechanism for intercepting a distorted output signal from a receiver and for generating an Nth order signal. A circuit is provided to subtract the Nth order signal from the distorted output signal for providing a circuit output signal. Finally, a feedback loop is provided to feed back the circuit output signal for controlling the Nth order signal and for providing a distortion corrected circuit output signal.

In a preferred embodiment, the distortion correction circuit includes a calibration circuit which provides a calibration signal employed to linearize a receiver channel. The receiver channel includes a plurality of receiver stages which receive the calibration signal and provide the distorted output signal which is intercepted and directed to a cubing circuit. The cubing circuit generates an error correction signal controlled by the feedback loop to cancel the distortion component of the distorted output signal. In the preferred embodiment, the feedback loop controls the amplitude and phase of the error correction signal while in another illustrative embodiment, only the amplitude of the error correction signal is controlled.

Thus, the invention discloses a correction circuit arrangement for a receiver channel which provides a distortion corrected output signal by effectively removing the distortion generated by the receiver.

DESCRIPTION OF THE INVENTION

Figure 1:
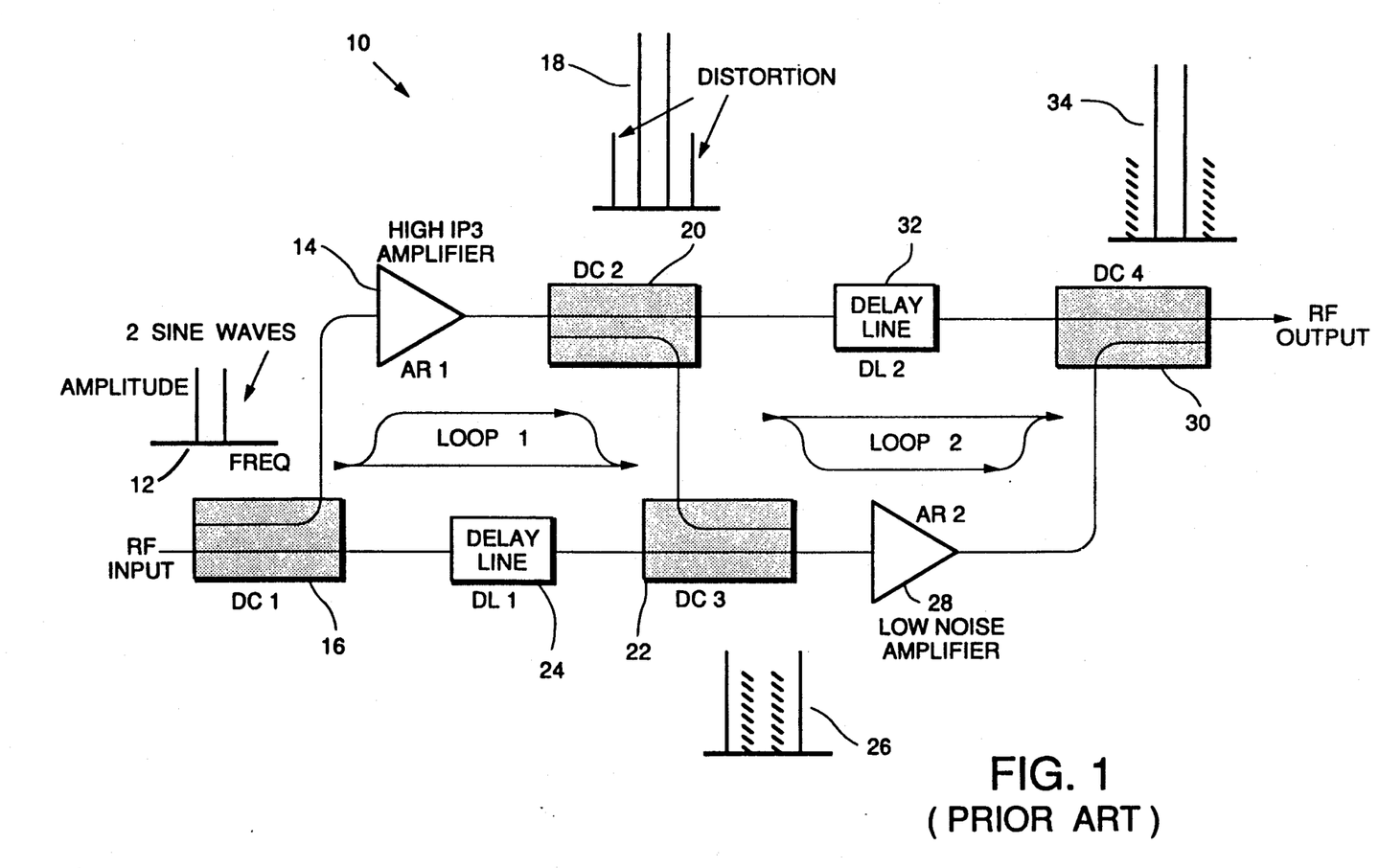
FIG. 1 is a simplified block diagram of a feedforward intermodulation distortion cancellation circuit of the prior art showing the circuitry employed to cancel amplifier generated distortion with characteristic signals illustrated at various stages.

Feedforward techniques are known. For example, the feedforward intermodulation distortion cancellation circuit 10, of the prior art, shown in FIG. 1 is directed to increasing the linearity of a single amplifier stage or each of a cascade of amplifiers. In the feedforward circuit 10, an RF input signal (comprised of two undistorted sine waves shown at 12) is coupled to a high power amplifier 14 via a first directional coupler 16. The high power amplifier 14 amplifies and, unfortunately, distorts the input signal providing a distorted power amplifier output signal (shown at 18). The distorted amplifier signal is then transmitted to a second directional coupler 20 as shown in FIG. 1. A sample of the distorted amplifier signal is thereafter rerouted to a third directional coupler 22. Simultaneously, the RF input signal (shown at 12) is transmitted to the third directional coupler 22 via a first delay line 24. The combination of structure described thus far in FIG. 1 forms a first loop.

Within the third directional coupler 22, the RF input signal is compared with and subtracted from the sample of the distorted amplifier signal to yield a signal (shown at 26) representing the distortion generated by the power amplifier. The signal representing the distortion is then passed through a low noise amplifier 28 which provides an error distortion signal. The error distortion signal is thereafter transmitted to a fourth directional coupler 30 which also receives the distorted amplifier signal (shown at 18) via a second delay line 32. This combination of structure forms a second loop as shown in FIG. 1. The error correction signal is then subtracted from the distorted amplifier signal in the fourth directional coupler 30 to yield an RF output signal (shown at 34) which is an amplified version of the RF input signal.

The feedforward technique shown in FIG. 1 is applicable only when the input and output frequencies are the same. Thus, the frequency of the RF input signal (shown at 12) must be equal to the frequency of the RF output signal (shown at 34). Therefore, the feedforward circuit 10 of FIG. 1 must be incorporated into each of a plurality of cascaded amplifier stages of a receiver channel 50 shown in FIG. 2 to achieve the desired linearity. Feedforward amplifier stages are used at each of the IF frequencies including the desired final IF frequency.

Figure 2:
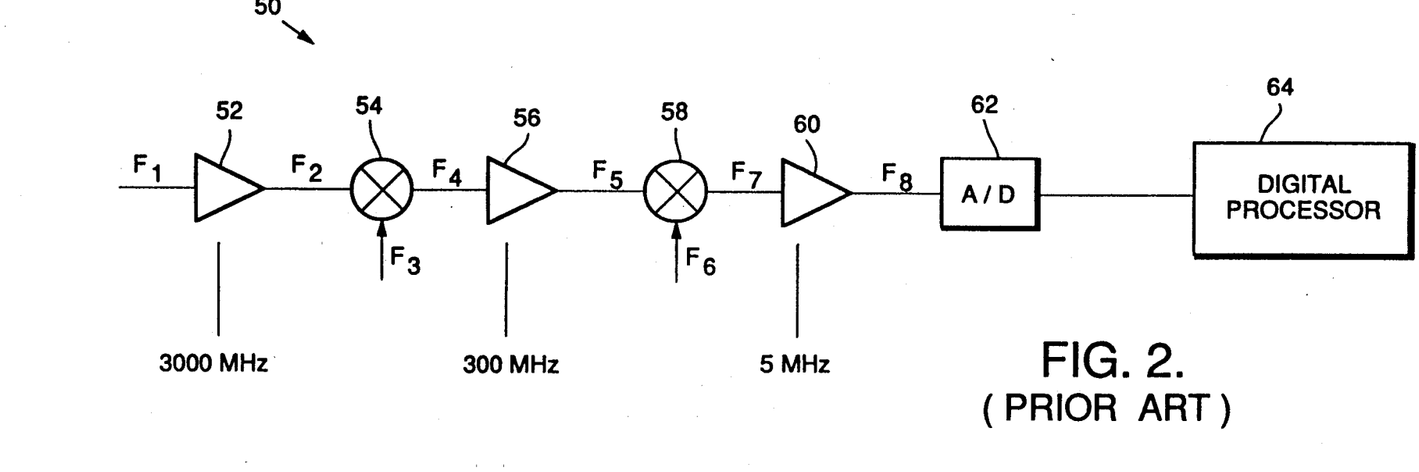
FIG. 2 is a simplified block diagram of a representative RADAR receiver channel employing the feedforward intermodulation distortion cancellation circuit of FIG. 1 at a plurality of stages.

In accordance with the above description, $f_1$ of a first feedforward circuit 52 must equal $f_2$ which might be, for example, 3000 MHz as shown in FIG. 2. The signal of frequency $f_2$ is directed to a mixer 54 and subtracted from a frequency $f_3$ to provide a frequency $f_4$. The signal having frequency $f_4$ is then directed to a second feedforward circuit 56 at which point the frequency has been reduced to 300 MHz. The signal outputted by the second feedforward circuit 56 has a frequency $f_5$ which equals frequency $f_4$. The signal having frequency $f_5$ is then transmitted to a second mixer 58 and subtracted from a signal having a frequency $f_6$ to provide a signal having a frequency $f_7$. The signal having the frequency $f_7$ is fed to a third feedforward circuit 60. The output signal of the third feedforward circuit 60 has a frequency $f_8$ which equals frequency $f_7$.

The technique continues with additional stages until the desired operating frequency is achieved, for example, 5 MHz. The signal having the frequency $f_8$ is then delivered to an analog-to-digital (A/D) converter 62 which transforms the analog signals to a digital word for processing by a digital processor 64. Note that all frequency corrections are completed prior to the signal having frequency $f_8$ entering the digital processor 64. Because the feedforward circuit 10 must be incorporated into each cascaded stage, the circuitry of this technique is space consuming and expensive. Further, the heat dissipation requirement is substantially increased.

Figure 3:
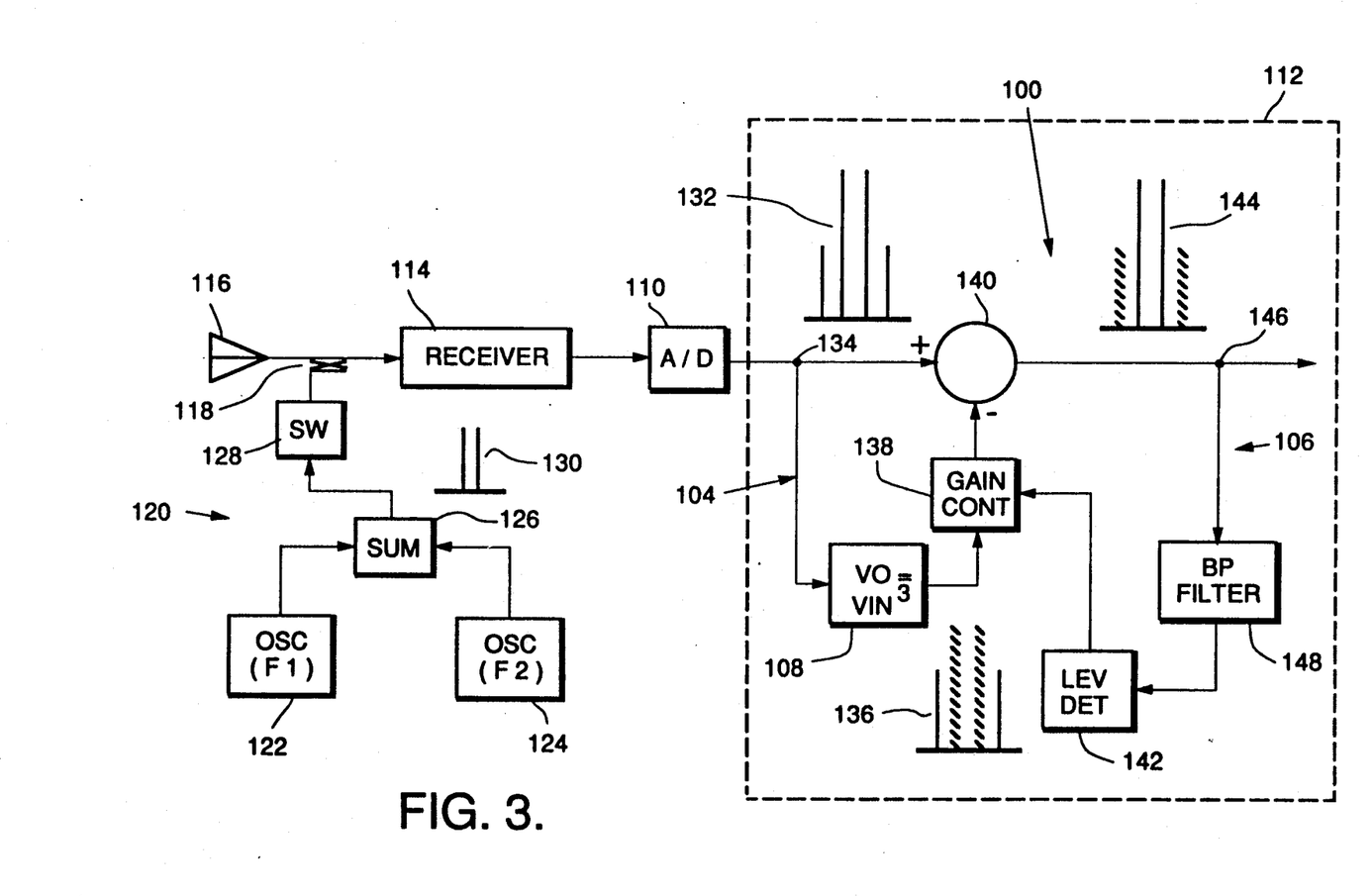
FIG. 3 is a detailed block diagram of an illustrative embodiment of a receiver distortion correction circuit of the present invention showing feedforward and feedback loops designed to cancel the amplitude component of non-linear receiver generated distortion.
Figure 4:
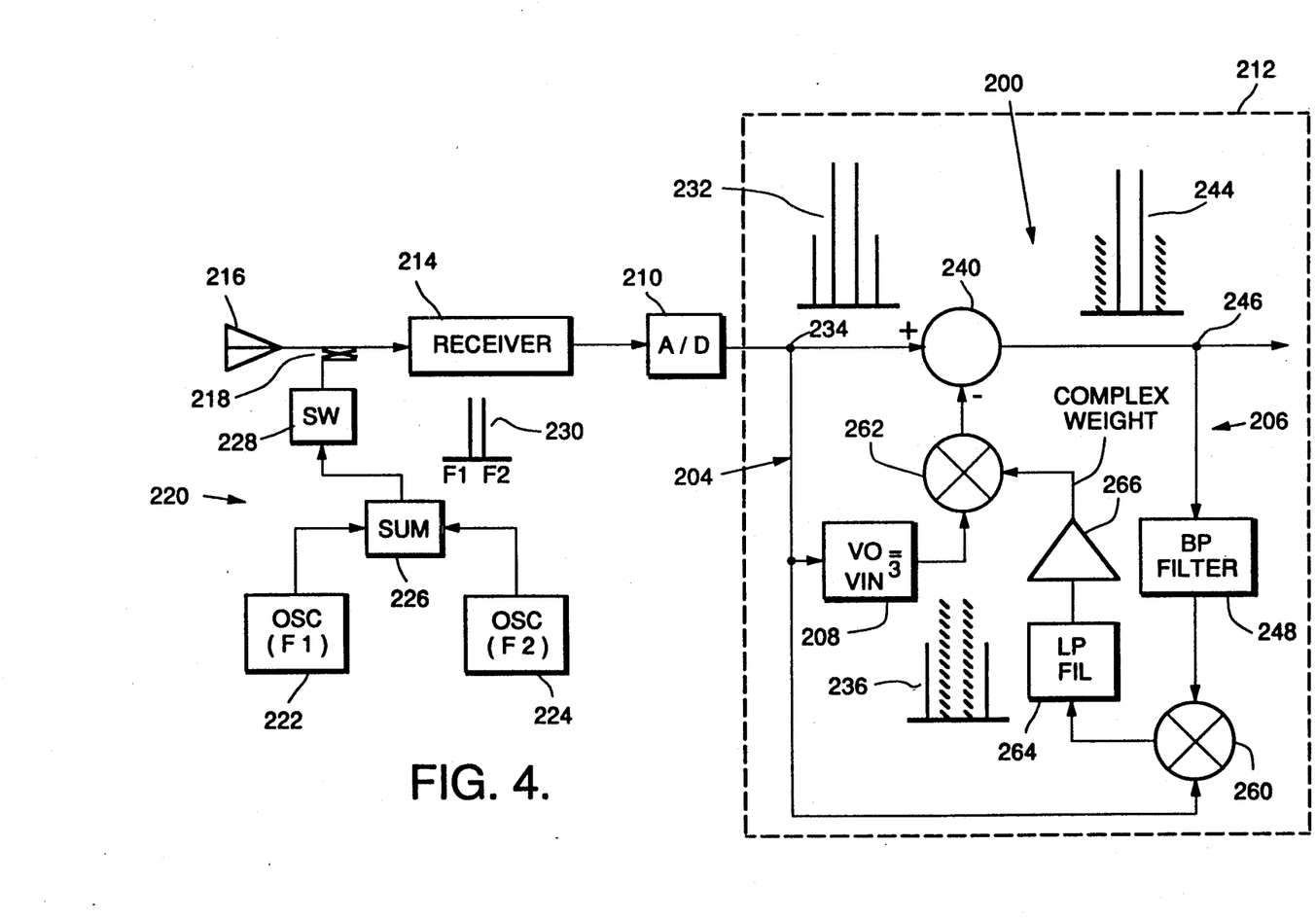
FIG. 4 is a detailed block diagram of a preferred embodiment of a receiver distortion correction circuit of the present invention showing feedforward and feedback loops designed to cancel the amplitude and phase components of non-linear receiver generated distortion.
Figure 5:
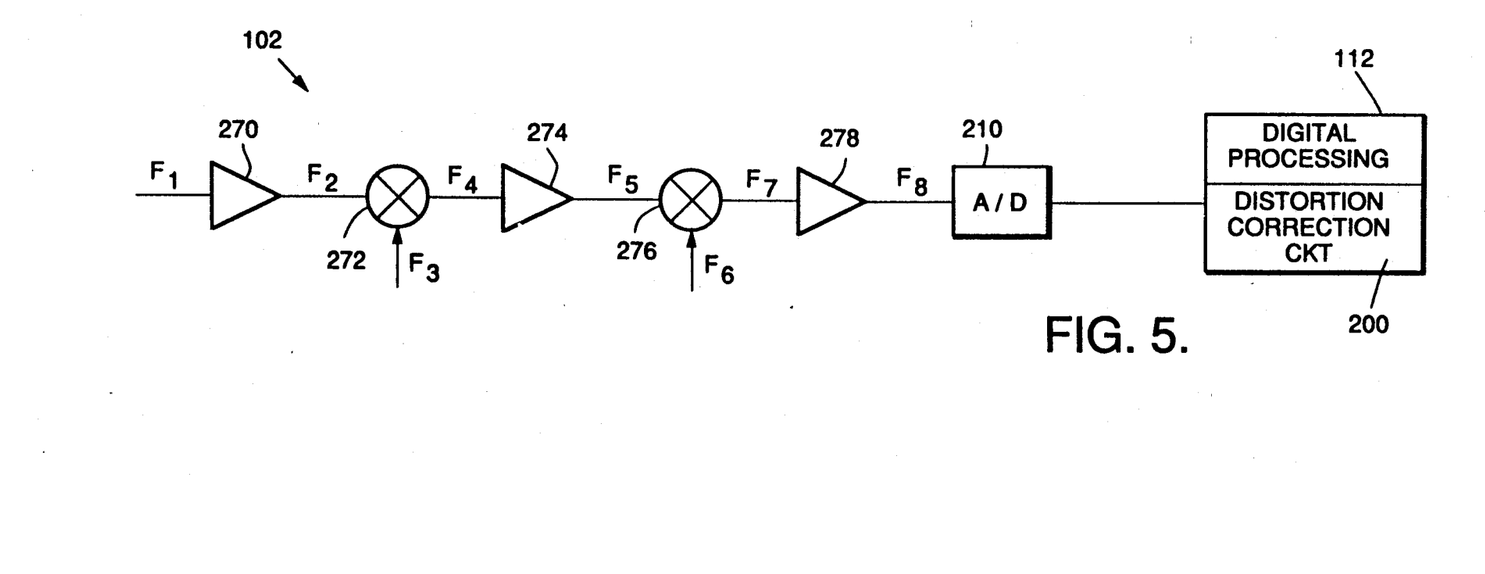
FIG. 5 is a simplified block diagram of a signal receiver channel incorporating the receiver distortion correction circuit of the present invention in a digital processor.

As shown in drawing FIGS. 3-5 for purposes of illustration, the invention is embodied in a distortion correction circuit 100 of the type used in a signal receiver channel 102 and having a feedforward loop 104 for generating an error correction signal employed for canceling a distortion component of a digitized output signal and a feedback loop 106 utilized to control the amplitude and phase of the error correction signal.

In accordance with drawing FIGS. 3-5 of the present invention, a cubing circuit 108 of the feedforward loop 104 generates an error correction signal while the feedback loop 106 cooperates by applying a weighted multiplier to said error correction signal to cancel the distortion component of a digitized output signal and to provide a distortion corrected circuit output signal. Further, the distortion correction circuit 100 permits linearizing the entire signal receiver channel 102 including an associated analog-to-digital converter 110 for automatically compensating for non-linearities caused by age and temperature variations within the receiver channel 102. Moreover, the non-linearities can be reduced by applying the correction circuit 100 to a digital processor 112 while avoiding the complexity and power dissipation attendant with compensating each receiver stage. Further, the correction circuit 100 is capable of adjusting the error correction for varying levels of non-linear distortion.

The distortion correction circuit 100 of the present invention introduces the distortion correction in the digital processor 112 following the analog-to-digital converter 110 as shown in FIGS. 3 and 5. This design permits the total non-linear error introduced by components located in a signal receiver 114 through the analog-to-digital converter 110 to be corrected. The correction circuit 100 is designed to be initialized during initial calibration of the receiver channel 102, notwithstanding the embodiment employed, for obtaining initial correction coefficients. Subsequent initialization should be undertaken during operational periods to update the correction coefficients.

An antenna 116, which functions to receive communication or RADAR signals, is shown connected to the signal receiver 114 via a directional coupler 118. Also connected to the signal receiver 114 through the directional coupler 118 is a calibration circuit 120. The calibration circuit 120 is comprised of first and second test tone oscillators 122 and 124, respectively, shown in FIG. 1. The first oscillator 122 generates a first test tone signal having frequency $f_1$ while the second oscillator 124 generates a second test tone signal having frequency $f_2$. The test tone signals $f_1$ and $f_2$ are combined in a summer 126 to provide a sum comprising, for example, (Cos $2\pi f_1 t$ + Cos $2\pi f_2 t$). The summed test tone signals are then transmitted to the directional coupler 118 through a control switch 128 when in the closed position. The control switch 128 can be, for example, an R.F. switch. The directional coupler 118 functions to inject the two test tone signals into the signal receiver 114 ahead of any non-linear components in the receiver 114.

The calibration circuit 120 is employed to linearize the signal receiver 114 while in the calibration mode. Once linearized, the control switch 128 is opened and the signal receiver 114 is placed into the receive mode. The receive mode permits the signal receiver 114 to receive signals, such as RF, microwave or other communication signals, from the antenna 116. In either the calibration or receive mode, the signal receiver 114 and the analog-to-digital converter 110 collectively distort the signal in a non-linear fashion (shown at 132). The non-linear distortion of the signal (shown at 132) can be, for example, third-order intermodulation distortion.

The calibration signal (shown at 130 in FIG. 1) comprised of the sum of the first and second test tone signals ($f_1$ and $f_2$) does not include non-linear distortion terms. Thus, a nondistorted test tone signal is injected into the signal receiver 114. Further, the frequencies $f_1$ and $f_2$ of the resulting calibration signal are selected to permit both test tones and the resulting third-order intermodulation distortion terms to fall within the passband of the signal receiver 114. The two tones of the calibration signal are then down converted to a final intermediate frequency (IF) by the signal receiver 114 and then sampled by the analog-to-digital converter 110. The calibration signal including the third-order intermodulation distortion terms (shown at 132) is available at a junction node 134 shown in FIG. 3.

The cancellation of the third-order intermodulation distortion terms of the distorted calibration signal (shown at 132) is completed within the digital processor 112. The distorted calibration signal (shown at 132) includes the original calibration signal (shown at 130) having the summed frequency tones ($f_1 + f_2$) and the third-order intermodulation distortion terms shown as side bands. The distorted calibration signal is directed from the junction node 134 to the cubing circuit 108 having stored therein a cubic transfer function. The cubing circuit 108 is an element of the feedforward loop 104. Within the cubing circuit 108, the distorted calibration signal (shown at 132) is represented as the analog-to-digital input voltage $V_{in}$. The voltage $V_{in}$ is then processed by the cubing circuit 108 by being operated upon by the cubic transfer function. The result is the cube of the voltage $V_{in}$ which is designated by the term $V_o$ or $V_{in}^3$ in FIG. 3 and is referred to as an error correction signal.

The error correction signal (shown at 136) is a duplicate of the distorted portion of the distorted calibration signal (e.g., $V_{in}$) with increased third-order intermodulation distortion caused by the cubic transfer function. In particular, the error correction signal is an artificial distortion derived by cubing the two tones ($f_1$ and $f_2$) of the calibration signal (shown at 130). The resulting artificial distortion is represented only by the side band terms ($2f_1 - f_2$) and ($2f_2 - f_1$). The original tones ($f_1$ and $f_2$) appear at a significantly lower level in pure spectral form in the error correction signal as is indicated by the two center dashed lines (shown at 136). The cubed signal ($V_{in}^3$) which forms the error correction signal is intentionally designed to be much larger than the distorted calibration signal. The error correction signal is an Nth order signal generated by the transfer function of the cubing circuit 108. In this application, the transfer function has been chosen as a cubic since third-order intermodulation distortion is the dominant distortion signal that is generated by the non-linear analog components of the circuit. However, other orders of the transfer function could be employed in the cubing circuit 108 if so desired.

The function of the feedforward loop 104 is to provide the error correction signal (shown at 136) which, by design, must be equal in magnitude and opposite in sign to the distortion component of the distorted calibration signal (shown at 132, e.g., $V_{in}$). The feedforward loop 104 is also comprised of a gain control circuit 138 and a subtracter circuit 140. The error correction signal (shown at 136) has significantly higher third-order distortion terms as compared to the third-order distortion terms of the distorted calibration signal (shown at 132). Therefore, the error correction signal is amplitude weighted by a value less than one to set the distortion terms of the error correction signal at the level of the distortion terms of the distorted calibration signal. This process permits canceling the distortion terms in the distorted calibration signal.

Cancellation of the distortion terms in the distorted calibration signal is accomplished as follows. The error correction signal (shown at 136) having the higher third-order distortion terms is transmitted to the gain control circuit 138. The function of the gain control circuit 138 is to control the level of the error correction signal. The gain control circuit 138 adjusts the amplitude of the error correction signal to be equal in amplitude and opposite in sign to the distortion component of the distorted calibration signal (shown at 132). Thus, when the two signals are added, the distortion components will cancel. The gain control circuit 138 also receives a signal from a level detector 142 located in the feedback loop 106 as described below. The amplitude weighted error correction signal is then transmitted to the subtracter circuit 140.

The function of the subtracter circuit 140 is to subtract the amplitude weighted error correction signal from the distorted calibration signal (shown at 132) to eliminate the distortion side bands (shown at 132). After the subtraction, the third-order distortion terms effectively cancel and the original undistorted two tones of the calibration signal (shown at 130) are left essentially intact. This undistorted signal available at the output terminal of the subtracter circuit 140 becomes the final output signal (shown at 144) of the distortion correction circuit 100. Thus, in the receiver mode, the distortion correction circuit 100 provides the final output signal (shown at 144) that is an undistorted duplicate of the calibration signal (shown at 130) that is amplified or down converted in frequency according to the function of signal receiver 114. During calibration, the final output signal is processed via the feedback loop 106 to detect any third-order distortion content therein.

Generally, the feedback loop 106 functions to control the feedforward loop 104 in the following manner. The final output signal is extracted at a junction node 146 and directed to a digital bandpass filter 148. The bandpass frequency range of the bandpass filter 148 is selected to pass only one of the distortion terms ($2f_1 - f_2$ or $2f_2 - f_1$) and to reject the two tones ($f_1$ and $f_2$) of the calibration signal (shown at 130) during the calibration stage. Any distortion terms present within the bandpass frequency range pass through the filter 148 and are fed to the level detector 142 as shown in FIG. 3. The level detector 142 detects the amplitude of any distortion signal present in the final output signal (shown at 144). It is desirable to eliminate the distortion in the final output signal, which is a digital number or word comprised of a series of ones and zeros. Thus, the distortion terms passing the bandpass filter 148 are level detected and utilized within the digital processor 112 to adjust the gain control weight of the non-linear error correction signal (shown at 136).

The appropriate weighting level to be employed in the gain control circuit 138 must be determined so that the subtracter circuit 140 eliminates the side bands in the distorted calibration signal (shown at 132). If the digital word representing the distortion in the final output signal (shown at 144) is large, the level detector 142 transmits an adjustment signal to the gain control circuit 138. The gain control circuit 138 then modifies the weighting factor to adjust the error correction signal (shown at 136) to be equal in amplitude and opposite in sign to the incoming distorted calibration signal (shown at 132). However, if the digital word representing the distortion in the final output signal (shown at 144) is small, the level detector 142 does not transmit an adjustment signal to the gain control circuit 138. This condition indicates that the error correction signal is approximately equal in amplitude and opposite in sign to the distorted calibration signal. Thus, the weighting factor of the gain control circuit 138 is not modified.

When the weighted error correction signal is equivalent to the distorted correction signal (shown at 132), the final output signal (shown at 144) does not include distortion terms. Thus, the entire signal receiver channel 102 has been linearized by employing the calibration circuit 120 and adjusting the gain control circuit 138 in the feedforward loop 104 prior to processing received RADAR or communication signals with the signal receiver 114. In this way, the distortion correction circuit 100 is capable of adjusting to varying non-linear distortion. This advantage has been accomplished by utilizing the calibration signal (shown at 130) to adjust the weighting correction coefficients for the gain control circuit 138. Once the weighting correction coefficients for the gain control circuit 138 are determined, the control switch 128 of the calibration circuit 120 is opened and the calibration signal (shown at 130) removed. The weighting correction coefficients are then applied to actual received data to remove unwanted non-linear distortion caused by the signal receiver 114. Recalibration or relinearization of the distortion correction circuit 100 will subsequently be required as the amplifier circuitry of the signal receiver channel 102 ages and the operating temperature drifts. Additionally, the above described distortion correction circuit 100 can be modified to correct other less dominant orders of distortion (e.g., 2nd, 4th, 5th and the like) by modifying the cubing circuit 108 to include the proper order transfer functions.

A preferred embodiment of the distortion correction circuit of the present invention is illustrated in FIG. 4 and identified by the reference numeral 200. Those elements shown in the distortion correction circuit 200 in FIG. 4 of the preferred embodiment which find substantial correspondence in structure and function to those corresponding elements shown in the distortion correction circuit 100 of FIG. 3 are designated with corresponding numerals of the two-hundred series.

The distortion correction circuit 200 includes a calibration circuit 220 operating through a directional coupler 218 with an antenna 216 to feed a signal receiver 214. The calibration circuit 220 operates in the manner previously described with respect to FIG. 3 and includes first and second test tone oscillators 222 and 224 providing test tone signals having frequencies $f_1$ and $f_2$. The test tone signals $f_1$ and $f_2$ are combined in a summer 226 to provide a sum comprising, for example, (Cos $2\pi f_1 t$ + Cos $2\pi f_2 t$). During the calibration mode, a control switch 228 is closed to inject a test calibration signal (shown at 230) comprised or the two tones ahead of any non-linear components in the signal receiver 214. The calibration signal is directed to the signal receiver 214 and an analog-to-digital converter 210. The non-linear operation of the signal receiver 214 and the analog-to-digital converter 210 generate distortion in the calibration signal providing a distorted calibration signal (shown at 232). The distorted calibration signal is a digital sample which includes third-order intermodulation distortion and is tapped-off an output terminal of the analog-to-digital converter 210 at a junction node 234 as shown in FIG. 4.

The distorted calibration signal (shown at 232) is directed to a subtracter circuit 240 and a cubing circuit 208, each located within a feedforward loop 204 and to a complex correlator 260 located within a feedback loop 206. The cubing circuit 208, which provides an error correction signal (shown at 236), functions in a manner identical to the like-named component disclosed with respect to FIG. 3. The error correction signal (shown at 236) is a duplicate of the distorted portion of the distorted calibration signal (shown at 232, e.g., $V_{in}$) with increased third-order intermodulation distortion caused by the cubic transfer function. The error correction signal is an artificial distortion derived by cubing the two tones ($f_1$ and $f_2$) of the calibration signal (shown at 230). The resulting artificial distortion is represented by the side band terms ($2f_1 - f_2$) and ($2f_2 - f_1$) and by the original tones ($f_1$ and $f_2$). Other less significant distortion terms are also included. The error correction signal represented by the cubed signal ($V_{in}^3$) or $V_o$ in the cubing circuit 208 is intentionally designed to be much larger than the distorted calibration signal (shown at 232). The error correction signal is an Nth order signal generated by the transfer function of the cubing circuit 208.

The error correction signal (shown at 236) is then weighted and subtracted from the distorted calibration signal (shown at 232) to form a final output signal (shown at 244). However, the weighting of the error correction signal (shown at 236) is a complex weighting (e.g., having in phase and in quadrature components) which is accomplished by a complex multiplier 262 as shown in FIG. 4. Thus, the distortion correction circuit 200 is capable of controlling both the phase and the amplitude of the calibration signal (shown at 230). The function of the complex multiplier 262 is to adjust the amplitude and phase of the error correction signal (shown at 236) to be equal and opposite to the distorted portion of the distorted calibration signal (shown at 232). The complex multiplier 262 multiplies the error correction signal by a complex weight which is usually less than one. The complex weight is determined by detecting the output of the complex correlator 260 as described below. The error correction signal, now weighted to have the amplitude and phase corresponding to the amplitude and phase of the distorted calibration signal (shown at 232), is transmitted to the subtracter circuit 240.

The weighted error correction signal is then subtracted from the distorted calibration signal (shown at 232) within the subtracter circuit 240 to provide the final output signal (shown at 244) which includes the original two tones. To eliminate any remaining distortion terms, a sample of the final output signal (shown at 244) is directed to a digital bandpass filter 248 located in the feedback loop 206. The bandpass frequency range of the filter 248 is selected to pass only one of the distortion components ($2f_1 - f_2$ or $2f_2 - f_1$) and to reject the two tones $f_1$ and $f_2$ of the final output signal (shown at 244). The output of the bandpass filter 248 is sent to the complex correlator 260 as shown in FIG. 4. The complex correlator 260 receives inputs from the bandpass filter 248 and the analog-to-digital converter 210. The complex correlator 260 functions to multiply the output signal of the bandpass filter 248 and the distorted calibration signal (shown at 232). This multiplication provides a signal having a low frequency which is (a) zero if distortion components in the final output signal (shown at 244) do not exist, or (b) a complex correction signal which is a time varying multiple product sample if distortion components in the final output signal (shown at 244) do exist.

The output signal of the complex correlator 260 is delivered to a low pass filter 264. The low pass filter 264 functions to block the high frequency products and pass the low frequency products of the complex correction signal. The low frequency products of the complex correction signal comprise a d.c. level resulting from the multiplication of the outputs of the bandpass filter 248 and the analog-to-digital converter 210. The d.c. level passing through the low pass filter 264 is transmitted to a complex digital amplifier 266. The output of the complex digital amplifier 266 provides a complex weight which is a digital number or word used to multiply the error correction signal (shown at 236) in the complex multiplier 262. Thus, the complex weight is determined by detecting the output of a complex correlation between a sample of the distorted calibration signal (shown at 232) and a sample of any intermodulation distortion terms in the final output signal (shown at 244) passing through the bandpass filter 248. After being multiplied by the complex weight, the error correction signal is equivalent in amplitude and phase to the distorted portion of the distorted calibration signal (shown at 232). An additional summation of the error correction signal and the distorted calibration signal within the subtracter circuit 240 results in the further elimination of any remaining intermodulation distortion terms.

This overall process forms a least-mean squared (LMS) adaptive non-recursive filter which is capable of adapting the error correction to changing non-linearity of the signal receiver channel 102. This advantage has been accomplished by utilizing the calibration signal (shown at 230) to adjust the complex weighting coefficients transmitted to the complex multiplier 262. This technique is also initialized during the calibration period. After the calibration period, the selected complex weighting coefficients are stored in the complex multiplier 262, the control switch 228 is opened and the test calibration signal (shown at 230) is removed. Error correction using the complex weighting coefficients would then be applied to RADAR and other communication signals received via the antenna 216 to remove unwanted non-linear distortion caused by the signal receiver 214. The distortion correction circuit 200 would thereafter require periodic recalibration with advancing age and temperature drifts of the signal receiver 214.

The distortion correction circuit 200 disclosed in FIG. 4 enjoys certain advantages over the distortion correction circuit 100 disclosed in FIG. 3. The advantages include that both the amplitude and phase of the error correction signal are adjusted to cancel the distortion components of RADAR and other communication signals exiting the analog-to-digital converter 210 and that the distortion correction circuit 200 operates faster since it is a complex weighted system. However, each of the embodiments 100 and 200, respectively, of the distortion correction circuit is an extension of feedforward error correction incorporating a feedback loop for controlling the feedforward loop.

A simplified block diagram of a signal receiver channel 102 incorporating the distortion correction circuit of the present invention in a digital processor 112 is shown in FIG. 5. Either embodiment 100 or 200, respectively, of the distortion correction circuit can be utilized in FIG. 5 and the selection of the preferred embodiment 200 is for convenience only. The present invention permits relocating the feedforward circuitry from each cascaded receiver stage to the digital processor 112 within the receiver channel 102. Assuming that the receiver stages are designed as gain stages or as frequency down conversion stages, cascaded stages are still required.

A plurality of cascaded stages interfacing with mixers for stepping the input signal frequency down through an intermediate frequency range is shown in FIG. 5. An input signal having frequency $f_1$ is fed to a first receiver gain stage 270 which provides a signal having frequency $f_2$ which equals frequency $f_1$. Signal frequency $f_2$ is multiplied with a signal frequency $f_3$ in a first mixer 272 for providing a signal frequency $f_4$. Signal frequency $f_4$ is fed to a second receiver gain stage 274 which provides an equivalent frequency signal $f_5$. Signal frequency $f_5$ is delivered to a second mixer stage 276 and multiplied with a signal frequency $f_6$ for providing a signal frequency $f_7$. Signal frequency $f_7$ is processed by a third receiver gain stage 278 providing an equivalent signal frequency $f_8$ which is delivered to the analog-to-digital converter 210. A digital signal $f_9$ which is equivalent to signal frequency $f_8$ and which includes non-linear intermodulation distortion appears at the output terminal of the analog-to-digital converter 210. It is the distorted signal frequency $f_9$ that is processed by the distortion correction circuit 200 housed within the digital processor 112 and disclosed in FIG. 4.

The present invention does not require feedforward architecture in each cascaded stage which permits the use of conventional structure as shown in FIG. 5. The feedforward architecture need only be employed in the digital processor 112 during a calibration interval providing the advantages of economy, space conservation and enhanced performance of the receiver channel 102. Further, the present invention is capable of correcting non-linear distortion of the entire receiver channel 102 rather than just a single gain stage. Also, the present invention is adaptive since the amount of error correction is adjustable for changing amounts of non-linear distortion in the receiver channel 102. Utilization of the distortion correction circuit results in a substantial increase in linearity of the signal receiver channel 102 without the cost of high power amplifiers and extremely high level mixers utilized in the prior art to overcome non-linear distortion. Since the distortion correction circuit can be implemented in either analog or digital form, a cost competitive dynamic range is achieved.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such modifications, applications and embodiments within the scope of the present invention.

Accordingly,

What is claimed is:

1. A distortion correction circuit comprising:
   means for intercepting a distorted output signal from a receiver and generating an Nth power signal;
   amplitude control means for controlling the amplitude of said Nth power signal;
   means for subtracting said amplitude controlled Nth power signal from said distorted output signal to provide a circuit output signal; and
   feedback means for feeding back said circuit output signal to said amplitude control means to control said Nth power signal and to provide a distortion corrected circuit output signal.

2. The distortion correction circuit of claim 1 wherein said means for intercepting said distorted output signal is a junction node.

3. The distortion correction circuit of claim 1 wherein said means for generating said Nth power signal includes a cubing circuit for cubing said distorted output signal.

4. The distortion correction circuit of claim 1 wherein said amplitude control means includes a gain control circuit.

5. The distortion correction circuit of claim 1 wherein said subtracting means includes a subtracter circuit for eliminating amplitude distortion in said distorted output signal.

6. The distortion correction circuit of claim 1 wherein said feedback means includes a bandpass filter having a bandpass frequency range selected to pass frequencies of a distortion component of said circuit output signal.

7. The distortion correction circuit of claim 4 wherein said feedback means includes a level detector for detecting the amplitude of a distortion component of said circuit output signal and for transmitting an amplitude signal to said gain control circuit for controlling the amplitude of said Nth power signal.

8. The distortion correction circuit of claim 1 wherein said means for generating said Nth power signal includes a complex multiplier circuit for controlling the amplitude and phase of said Nth power signal.

9. The distortion correction circuit of claim 1 wherein said subtracting means includes a subtracter circuit for eliminating amplitude and phase distortion in said distorted output signal.

10. The distortion correction circuit of claim 1 wherein said feedback means includes a complex correlator which provides a complex correction signal for controlling the amplitude and phase of said Nth power signal.

11. The distortion correction circuit of claim 10 wherein said feedback means includes a low pass filter for passing low frequency components of said complex correction signal.

12. The distortion correction circuit of claim 1 wherein said feedback means includes a complex digital amplifier for providing a complex weighted number to a complex multiplier circuit to control the amplitude and phase of said Nth power signal.

13. The distortion correction circuit of claim 1 further including calibration circuit means for providing a calibration signal to linearize said receiver coupled to said receiver input.

14. The distortion correction circuit of claim 13 wherein said calibration circuit means includes a plurality of oscillators and a summer for generating said calibration signal.

15. The distortion correction circuit of claim 13 wherein said calibration circuit means is connected to said receiver through a switch during a calibration mode.

16. A distortion correction circuit for linearizing a receiver channel comprising:
   means for providing a calibration signal;
   means for receiving said calibration signal and for providing a distorted output signal;
   means for intercepting said distorted output signal from said providing means and for generating an Nth power signal;
   means for controlling the amplitude of the Nth power signal;
   means for subtracting said amplitude controlled Nth power signal from said distorted output signal to provide a circuit output signal; and
   feedback means for feeding back said circuit output signal to said amplitude control means to control said Nth power signal and to provide a distortion corrected circuit output signal.

17. A method for linearizing a receiver channel, said method comprising the steps of:
   providing a calibration signal for linearizing a plurality of receiver stages within said receiver channel;
   receiving said calibration signal in said receiver stages and providing a distorted output signal;
   intercepting said distorted output signal from said receiver stages and generating an Nth power signal;
   controlling the amplitude of said Nth power signal;
   subtracting said amplitude controlled Nth power signal from said distorted output signal for providing a circuit output signal; and
   feeding back said circuit output signal for controlling said Nth power signal to provide a distortion corrected circuit output signal.

18. The method of claim 17 further including the step of selecting a frequency range for a bandpass filter to pass frequencies of a distortion component of said circuit output signal.

19. The method of claim 17 further including the step of cubing said distorted output signal for generating said Nth power signal.

20. The method of claim 17 further including the step of controlling the amplitude of said Nth power signal to provide said distortion corrected circuit output signal.

21. The method of claim 17 further including the step of controlling the amplitude and phase of said Nth power signal to provide said distortion corrected circuit output signal.

* * * * *